United States Patent Office.

WILLIAM B. GUERNSEY, OF NORWICH, NEW YORK.

Letters Patent No. 62,411, dated February 26, 1867.

IMPROVEMENT IN PACKING AND PRESERVING BUTTER.

*The Schedule referred to in these Letters Patent and making part of the same.*

---

TO ALL WHOM IT MAY CONCERN:

Be it known that I, WILLIAM B. GUERNSEY, of Norwich, in the county of Chenango, and State of New York, have invented a new and improved Mode of Preserving Butter and Lard; and I do hereby declare that the following is a full, clear, and exact description thereof, which will enable others skilled in the art to make and use the same.

The nature of this invention consists in preparing wooden packages for preserving fatty and oily substances, such as butter, lard, tallow, &c., by an application to their surfaces of paraffine. Fresh butter and lard, if packed in wooden boxes, firkins, or tubs, which have been saturated with paraffine, will keep sound and sweet for a long period.

Paraffine is a tasteless, inodorous, and innocuous substance, which has but little affinity for other substances, as its name implies, and therefore imparts neither flavor, smell, nor extraneous quality of any kind to the most delicate butter, when placed in contact with it. It also resists the action of acids and alkalies, and is unaffected by the salt in butter, or the pyroligneous acid contained in wooden vessels, and the saturation with paraffine renders the wood impervious to air and water. For these reasons, when butter is carefully packed in wooden vessels saturated with paraffine, it will be completely protected against the deleterious effect of the air or the acid in wood, which soon destroys its original purity and renders it rancid. Noxious odors, which have a strong affinity for butter and other fatty substances, and injure the flavor of butter very rapidly, are also entirely excluded by a paraffine envelope. The peculiar bloom which distinguishes fresh, well-made butter is likewise preserved, so that it does not become discolored and sodden in appearance, like butter wrapped in cloths and immersed in brine. Butter, therefore, when packed in wooden vessels, thus prepared by saturation with paraffine, will retain its original purity and delicacy of flavor for an indefinite length of time, and keep sound and sweet, even when shipped to hot climates.

I am aware that boxes and vessels have been made air-tight by an internal lining or enamel of paraffine, but this is not what I claim as of my invention. My invention consists in so treating the boxes that the paraffine is caused to saturate or entirely to permeate the wood, so that fatty or oily matters cannot come in contact with the fibres of the wood, as they are likely to if a mere coating or enamel of paraffine is applied to the surface of the wood. I accomplish this saturation by applying the paraffine at a very high temperature, continuing the exposure of the wooden fabric of the box to the action of the said paraffine for a sufficient length of time to cause it to permeate the pores of the wood thoroughly. The above action is facilitated by rendering the thickness of the wood as much as is compatible with the requisite strength, probably not exceeding the twelfth of an inch in thickness, in which proportion they may be considered as veneers. The veneers, being thoroughly seasoned, and warmed to a temperature of say 300° Fahr., are treated by a brush with paraffine at a heat of boiling water; or the heated paraffine may be applied to the heated wood in any other sufficient manner which may readily occur to one familiar with this class of subjects. A special advantage is derived from the saturation of the wood with paraffine, as it thereby becomes non-absorbent, and preserves its shape when exposed to hygrometric changes.

Having described my invention, I wish it to be understood that I do not claim coating wooden surfaces with an enamel of paraffine, but what I claim is—

1. A wooden box or containing vessel, saturated with paraffine, substantially as described.

2. I further claim the use of paraffine to protect the glued or cemented joints of wooden boxes or packages from the effects of moisture from the atmosphere, or from contained substances.

The above specification of my invention signed by me this 14th day of September, 1866.

W. B. GUERNSEY.

Witnesses:
WM. F. MCNAMARA,
ALEX. F. ROBERTS.